Figure 1:
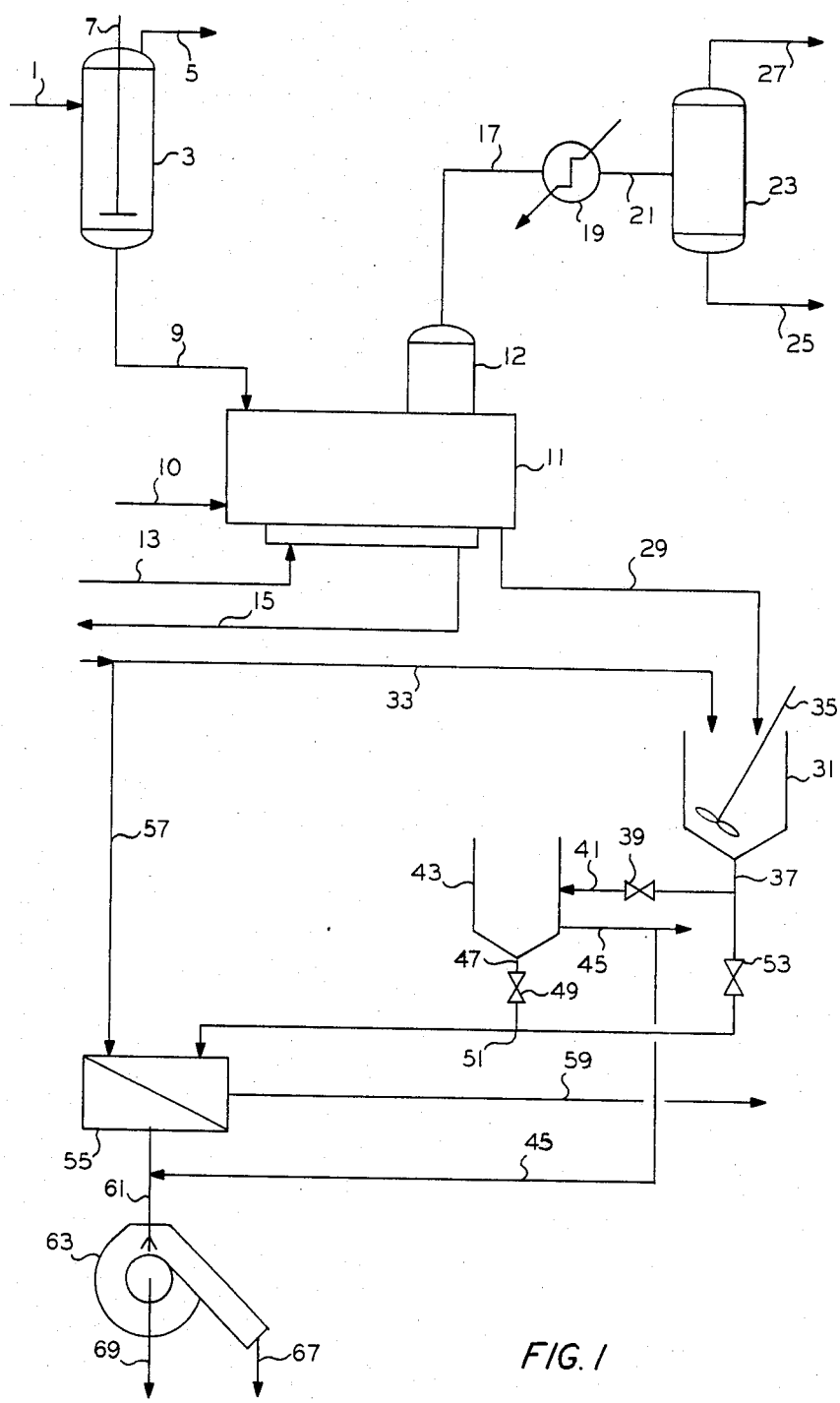

United States Patent [19]

Sherk et al.

[11] Patent Number: 4,524,200

[45] Date of Patent: Jun. 18, 1985

[54] GRANULAR POLY(ARYLENE SULFIDE) RECOVERY USING EVAPORATION

[75] Inventors: Fred T. Sherk; Afif M. Nesheiwat; Guy Senatore, all of Bartlesville, Okla.

[73] Assignee: Phillips Petroleum Company, Bartlesville, Okla.

[21] Appl. No.: 611,573

[22] Filed: May 18, 1984

Related U.S. Application Data

[63] Continuation of Ser. No. 423,592, Sep. 27, 1982, abandoned.

[51] Int. Cl.$^3$ ............................................. C08G 75/14
[52] U.S. Cl. .................................................... 528/388
[58] Field of Search ......................................... 528/388

[56] References Cited

U.S. PATENT DOCUMENTS

| | | | |
|---|---|---|---|
| 3,478,000 | 11/1969 | Saunders et al. | 260/79.1 |
| 3,707,528 | 12/1972 | Miles | 260/79 |
| 3,800,845 | 4/1974 | Scoggin | 159/47 |
| 4,415,729 | 11/1983 | Scoggins et al. | 528/388 |

*Primary Examiner*—Melvyn I. Marquis
*Attorney, Agent, or Firm*—A. W. Umphlett

[57] ABSTRACT

Granular poly(arylene sulfide) is recovered from a slurry comprising granular poly(arylene sulfide), polar organic solvent, alkali metal halide, poly(arylene sulfide) oligomers, untreated reactants in the water by heating the slurry under conditions to evaporate polar organic solvent, water and volatile impurities at a temperature below the normal boiling point of the polar organic solvent to produce a dry mixture containing poly(arylene sulfide), poly(arylene sulfide) oligomers and alkali metal halide which is then reslurried with water to produce a reslurried mixture containing aqueous alkali metal halide solution and dispersed poly(arylene sulfide) oligomers with the reslurried mixture being filtered through a coarse screen to recover granular poly(arylene sulfide) thereon and pass a filtrate containing poly(arylene sulfide) oligomers and aqueous alkali metal halide solution therethrough. The filtrate can be further treated by filtering through a filter aid coated vacuum filter to recover poly(arylene sulfide) oligomers thereon and pass an aqueous alkali metal halide solution therethrough as filtrate.

23 Claims, 1 Drawing Figure

GRANULAR POLY(ARYLENE SULFIDE) RECOVERY USING EVAPORATION

This is a continuation application of a co-pending Ser. No. 423,592, filed on Sept. 27, 1982, and now abandoned.

BACKGROUND OF THE INVENTION

This invention relates to processes for the recovery of poly(arylene sulfide) from a poly(arylene sulfide) reaction mixture. In one of its aspects, the invention relates to the separation of solid and liquid components of the reaction mixture of the reaction of polyhalo-substituted aromatic compounds and polar organic solvent to provide poly(arylene sulfide). In another of its aspects, this invention relates to the recovery of particulate poly(arylene sulfide) by separation from the other components of this reaction mixture. In still another aspect of the invention, it relates to vacuum evaporation processes.

In one concept of this invention it provides a method for separating the reaction mixture of the reaction of polyhalo-substituted aromatic compounds and polar organic solvent into a particulate poly(arylene sulfide) that is recovered from the reaction mixture and other components that can be separated for recovery or disposal.

A basic process for the production of arylene sulfide polymers from polyhalo-substituted cyclic compounds containing unsaturation between adjacent ring atoms, wherein the halogen atoms attached to ring carbon atoms react with an alkali metal sulfide in a polar organic compound at an elevated temperature is disclosed in U.S. Pat. No. 3,354,129. Since the disclosure of that invention a great amount of experimental work has been completed which resulted in the disclosure of methods for both batch and continuous operations to produce poly(arylene sulfides) not only from p-dihalobenzenes but also containing polyhalo aromatic compounds having more than two halogen substituents per molecule and with the addition of various polymerization modifying compounds such as alkali metal carboxylates. Processes have also been disclosed in which various reactants can be premixed to form reaction complexes before all of the reactants are brought together at polymerization conditions. All of these processes have in common the production at a temperature above that at which poly(arylene sulfide) is in molten phase, of a reaction mixture containing poly(arylene sulfide) and a polar organic solvent along with various impurities and unreacted reactants from which solid poly(arylene sulfide) is recovered. The process of the present invention is also adaptable for recovery of granular poly(arylene sulfide) from any slurry which contains granular poly(arylene sulfide) with polar organic solvent, alkali metal halide, poly(arylene sulfide) oligomers, unreacted reactants from the polymerization process and water.

It is therefore an object of this invention to provide a method for recovering the granular poly(arylene sulfide) particles from a slurry comprising granular poly(arylene sulfide), polar organic solvent, alkali metal halide, particularly sodium chloride, poly(arylene sulfide) oligomers, unreacted reactants and water. Another object of this invention is to provide a method for recovering relatively large, granular poly(arylene sulfide) particles from a reaction mixture containing poly(arylene sulfide) and polar organic solvent. It is another object of this invention to provide a method for recovering poly(arylene sulfide) having a particle size distribution resulting in improved filterability and reduced dustiness as compared to the resin recovered by solvent flashing methods. It is still another object of the invention to provide a method for recovering poly(arylene sulfide) having a particle size distribution that will eliminate the need for special treatments or handling of the recovered particles prior to their subsequent uses. It is still another object of the invention to produce poly(arylene sulfide) having a generally higher bulk density than is produced by solvent flashing methods of recovering the polymer from its reaction mixture. It is still another object of this invention to provide a method for recovery of poly(arylene sulfide) which facilitates separation of arylene sulfide oligomers from the reaction mixture. It is another object of this invention to produce useful manufactured articles from poly(arylene sulfide) recovered by the method of this invention. It is still another object of this invention to provide a method for recovery of poly(arylene sulfide) which results in particulate polymer suitable for further treatment and the production of manufactured articles such as films, sheets, fibers, molded articles, and extruded articles.

Other aspects, concepts, and objects of this invention will become apparent to those reading this disclosure and studying the appended drawings and claims.

STATEMENT OF THE INVENTION

In accordance with this invention, a method is provided in a process for recovery of granular poly(arylene sulfide) from a slurry comprising granular poly(arylene sulfide), polar organic solvent, alkali metal halide, poly(arylene sulfide) oligomers, unreacted reactants and water in which the slurry is heated under pressure conditions sufficient to evaporate polar organic solvent, water and volatile impurities such as unreacted reactants at a temperature below the normal boiling point of the polar organic solvent to produce a dry mixture containing poly(arylene sulfide), poly(arylene sulfide) oligomers, and alkali metal halide, particularly NaCl, with a subsequent reslurrying of the dry mixture with water to extract alkali metal halide, particularly NaCl, and other soluble impurities and disperse poly(arylene sulfide) oligomers. The reslurried mixture is then classified, as by being filtered through a screen, thereby recovering granular poly(arylene sulfide) thereon and passing a filtrate comprising poly(arylene sulfide) oligomers and aqueous alkali metal halide solutions therethrough.

In particular embodiments of the invention the conditions for evaporating polar solvents can entail heating under vacuum conditions or heating at atmospheric or greater pressure using an inert gas to provide a controlled total pressure as the volatile components are evaporated.

In further embodiments of the invention the filtrate can be filtered through a vacuum filter coated with filter aid thereby recovering poly(arylene sulfide) oligomers thereon and passing therethrough a second filtrate that is principally aqueous alkali metal halide solution.

It is also within the scope of this invention further to treat the reslurried mixture containing aqueous alkali metal halide solution and dispersed poly(arylene sulfide) oligomers by allowing the granular poly(arylene sulfide) to settle and removing at least a portion of the liquid containing aqueous alkali metal halide solution and dispersed poly(arylene sulfide) oligomers before carrying out the filtering process.

It is also within the scope of this invention that the reslurried mixture containing granular poly(arylene sulfide), aqueous alkali metal halide solution and dispersed poly(arylene sulfide) oligomers be subjected to multiple processes of filtering and reslurrying of the filter cake thereby further separating undesirable contaminants from the particulate poly(arylene sulfide) before drying the particulate polymer and subjecting it to further processing to produce articles such as films, fibers, molded objects, and extruded articles.

The process of the present invention is suitable for the recovery of poly(arylene sulfide) produced by any method that results in a slurry comprising granular poly(arylene sulfide), polar organic solvent, alkali metal halide, particularly NaCl, poly(arylene sulfide) oligomers, unreacted reactants and water as the major identifiable components of the mixture. The process of the present invention is particularly suitable for use in recovering poly(arylene sulfide).

In accordance with further embodiments of the invention the reaction mixture, after the production of the slurry of particulate poly(arylene sulfide) in polar organic solvent, is subjected to further treatments to separate and recover arylene sulfide polymer particles and to separate and recover or dispose of the other components of the reaction mixture.

The process of the present invention is suitable for use in recovering poly(arylene sulfide) produced by any method that results in a reaction mixture containing a molten poly(arylene sulfide), polar organic solvent, various impurities, and unreacted reactants. The most common of impurities will be by-product alkali metal halide-principally sodium chloride (NaCl)-and poly(arylene sulfide) oligomers which are gelatinous materials commonly described as "slime" because of their physical properties. Processes that will produce such a reaction mixture are set forth in U.S. Pat. No. 3,354,129 and its derivatives in which polyhalo-substituted aromatic compounds are reacted with sulfur-containing reactants in a polar organic solvent, optionally with polymerization modifying compounds, either in batch or continuous operations. Reaction mixtures that can be treated by the process of this invention also include those in which components of the reaction mixture are premixed to form complexes before all of the components are brought together under polymerization conditions.

Although other components are not excluded from the reaction mixture, in general, arylene sulfide polymers treated by the process of this invention are phenylene sulfide polymers produced by the contacting of at least one p-dihalobenzene, under polymerization conditions for a period of time sufficient to form a phenylene sulfide polymer, with a mixture in which at least one alkali metal sulfide or other sulfur source and a polar organic solvent, often with the addition of such optional components as a minor amount of a polyhalo aromatic compound having more than two halogen substituents per molecule, and/or a polymerization modifying compound such as an alkali metal carboxylate or a lithium halide. Some of the more common components of these reaction mixtures are listed below:

p-Dihalobenzenes which can be employed by the process of this invention can be presented by the formula

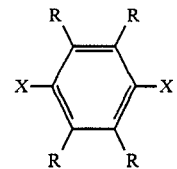

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene 1-butyl-4-cyclohexyl-2,5-dibromobenzene, 1-hexyl-3-dodecyl-2,5-dichloro benzene, 1-octadecyl-2,5-diiodobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichlorobenzene, and the like and mixtures thereof.

Polyhalo aromatic compounds having more than two halogen substituents per molecule which can be employed in the process of this invention can be represented by the formula $R'X'_n$, where each $X'$ is selected from the group consisting of chlorine and bromine, preferably chlorine, n is an integer of 3 to 6, and $R'$ is a polyvalent aromatic radical of valence n which can have up to about 4 methyl substituents, the total number of carbon atoms in $R'$ being within the range of 6 to about 16.

Examples of some polyhalo aromatic compounds having more than two halogen substituents per molecule which can be employed in the process of this invention include 1,2,3-trichlorobenzene, 1,2,4-trichlorobenzene, 1,3-dichloro-5-bromobenzene, 2,4,6-trichlorotoluene, 1,2,3,5-tetrabromobenzene, hexachlorobenzene, 1,3,5-trichloro-2,4,6-trimethylbenzene, 2,2',4,4'-tetrachlorobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Alkali metal sulfides which can be employed in the process of this invention include lithium sulfide, sodium sulfide, potassium sulfide, rubidium sulfide, cesium sulfide, and mixtures thereof. Preferably, the alkali metal sulfide is used as a hydrate or as an aqueous mixture. If desired, the alkali metal sulfide can be prepared as an aqueous solution by the reaction of an alkali metal hydroxide with an alkali metal bisulfide in aqueous solution.

Alkali metal carboxylates which can be employed in the process of this invention can be represented by the formula $R''CO_2M$, where $R''$ is a hydrocarbyl radical selected from alkyl, cycloalkyl, and aryl, and combinations thereof such as alkaryl, aralkyl, and the like, the number of carbon atoms in said $R''$ being within the range of 1 to about 20, and M is an alkali metal selected from lithium, sodium, potassium, rubidium and cesium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octanoate, sodium heneicosanoate, lithium cyclohexanecarboxylate, sodium 3-methyl-cyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

The amount of alkali metal carboxylate generally used as a polymerization modifier in the polymerization reaction—usually about 0.05 to about 4, preferably about 0.1 to about 2 gram-moles carboxylate/gram-mole of p-dihalobenzene—will serve to reduce the amount of separating agent needed in this invention.

Lithium halides which can be employed in the process of this invention include lithium chloride, lithium bromide, lithium iodide, and mixtures thereof.

Alkali metal hydroxides which can be employed in the process of this invention include lithium hydroxide, sodium hydroxide, potassium hydroxide, rubidium hydroxide, cesium hydroxide, and mixtures thereof.

The polar organic solvents useful in the present invention are solvents for the polyhalo aromatic compounds and the alkali metal sulfides used in the production of arylene sulfide polymers. Examples of such polar organic solvents include amides, including lactams, and sulfones. Specific examples of such polar organic solvents include hexamethylphosphoramide, tetramethylurea, N,N'-ethylenedipyrrolidone, N-methyl-2-pyrrolidone (NMP), pyrrolidone, caprolactam, N-ethylcaprolactam, sulfolane, N,N'-dimethyl-acetamide, low molecular weight polyamides, and the like. The polar organic solvent presently preferred is N-methyl-2-pyrrolidone (NMP).

Water is the preferred agent for causing separation of molten poly(arylene sulfide) from the polar organic solvent; however, any liquid can be used (1) that is soluble in the polar organic solvent used in the reaction mixture; (2) that is not itself a solvent for poly(arylene sulfide) and (3) that has boiling characteristics suitable for the reaction and recovery conditions of this process. In general, paraffinic hydrocarbons, higher boiling alcohols, and higher boiling ethers are suitable compounds for use alone or in admixture.

Although the reaction temperature at which the polymerization is conducted can vary over a wide range, generally it will be within the range of about 420° F. to about 600° F., preferably about 435° F. to about 540° F. The reaction time can vary widely, depending in part on the reaction temperature, but generally will be within the range of about 10 minutes to about 72 hours, preferably about 1 hour to about 8 hours. The pressure should be sufficient to maintain the N-methyl-2-pyrrolidone, the p-dihalobenzene, and the polyhalo aromatic compound having more than two halogen substituents per molecule, if used, substantially in the liquid phase.

Polymerization of various components set out above can with other components well known in the art result in a reaction mixture at a temperature above that at which poly(arylene sulfide) is in molten phase comprising poly(arylene sulfide), polar organic diluent, arylene sulfide oligomers ("slime"), sodium chloride, and unreacted reactants as the major components of the reaction mixture. For commercial purposes, currently most usually, the poly(arylene sulfide) would be poly(phenylene sulfide) (PPS) and the polar organic solvent would be N-methyl-2-pyrrolidone (NMP). A method has recently been provided for converting the molten poly(arylene sulfide) into relatively large, coarse, particulate poly(arylene sulfide) that is readily separable from the other components of the reaction mixture. In this method the temperature of the polymerization reaction mixture is reduced sufficiently to produce a slurry comprising particulate poly(arylene sulfide) and polar organic solvent while the reaction mixture is in the presence of an amount of a separation agent, i.e., a liquid soluble in the polar organic solvent but not itself a solvent for poly(arylene sulfide), preferably water, sufficient to cause a phase separation of molten poly(arylene sulfide) for the polar organic solvent. In the preparation of poly(arylene sulfide) using alkali metal carboxylate sufficient separation agent can be present in the reaction mixture to cause a phase separation between molten poly(arylene sulfide) and polar organic solvent, but the addition of separation agent, preferably deionized water, to this mixture can enhance the separation. When alkali metal carboxylate is present, a lesser amount of separation agent is necessary to cause phase separation. After the phase separation has been accomplished, the temperature of the separated phase is lowered from the range in which the poly(arylene sulfide) is molten into the range in which it solidifies, i.e., from about 500° to 600° F. to a temperature below 350° F., generally within the range of about 300° to 350° F. Relatively large, coarse particles of about 0.04 to about 4 mm are formed which is in contrast to the fine powder produced by other known methods of recovery of the polymer.

The process of the present invention is a currently preferred method for separation of particulate poly(arylene sulfide) from its reaction mixture slurry particularly as produced by the method described above, but also from any other method of production that would yield a similar mixture.

To illustration the operation of the present invention a preferred operation in a continuous process will be described below in conjunction with a drawing which is a schematic representation of a process for separating particulate poly(phenylene sulfide) (PPS) from its reaction mixture slurry.

Referring now to the drawing, suitable reactants are introduced through line 1 into reaction vessel 3 under conditions suitable to produce a slurry of coarse particulate poly(phenylene sulfide) (PPS) in a reaction mixture which also contains polar organic solvent, NaCl, poly(phenylene sulfide) oligomers, unreacted reactants and water. The process of preparing such a mixture does not form a part of this invention; but, typically, can be carried out as follows:

Aqueous solutions of NaOH and NaHS are fed into the reaction vessel 3 for neutralization to yield primarily a dissolved $Na_2S$. N-methyl-2-pyrrolidone (NMP) is then fed into the vessel to flush all the material from the lines into vessel 3 which serves as a dehydration and polymerization reactor. The feed line into the stirred vessel is then flushed with nitrogen gas which is vented through the vessel and line 5. Additional NMP and sodium acetate are charged through line 1 into dehydration/polymerization vessel 3 to provide a mixture of water, NMP, sodium sulfide and sodium acetate in the vessel. Optionally, the sodium acetate can be replaced by charging NaOH and acetic acid into the dehydration/polymerization vessel 3 so that the sodium acetate is prepared in situ. The mixture of water, NMP, sodium sulfide and sodium acetate is heated by means of heat transfer coils (not shown) containing hot oil. Rising vapors are passed through line 5 for fractionation in a distillation column (not shown). After the dehydration process, p-dichlorobenzene (DCB) is added to vessel 3 through line 1, and, optionally, 1,2,4-trichlorobenzene (TCB) is added to reactor 3 through line 1. The mixture is heated under polymerization conditions to form a reaction mixture containing a molten PPS resin, unreacted reactants, phenylene sulfide oligomers ("slime"), and sodium chloride dissolved in NMP and water.

Since sodium acetate and water are present in the reaction mixture a small amount of deionized water can, optionally, be charged to the polymerization vessel 3 through line 1 on completion of the polymerization to facilitate the separation of the molten PPS phase from the second liquid phase comprising NMP, phenylene sulfide oligomers, sodium chloride and the unreacted reactants. If sodium acetate is not used in the reaction or an anhydrous reaction mixture or reaction mixture containing relatively little water results from the reaction, a sufficient amount of deionized water can be added through line 1 to cause separation of the molten PPS from the second liquid phase. During the phase separation the reaction mixture is vigorously stirred by agitator 7 and the temperature of the reactor is reduced so that after the separation the liquid PPS phase gradually solidifies as its temperature drops below the transition temperature. There is produced a slurry of coarse particulate PPS in the reaction mixture.

This mixture, according to the present invention, is then transferred through line 9 to an evaporator 11 which is heated indirectly by heat exchange material transferred into the vessel through line 13 and removed from the vessel after heat exchange through line 15. The temperature is maintained under suitable conditions to evaporate NMP, water and volatile impurities which are removed through line 17, passed through condenser 19 and line 21 into condensate collection tank 23 from which the condensed water, NMP and other condensed materials can be removed through line 25 for further purification. Other non-condensed vapors are removed from condensate tank 23 through line 27.

When the evaporator 11 is maintained at vacuum conditions during the evaporation process, the effluent gases, which have been evaporated at a temperature below the normal boiling point of the polar organic solvent (i.e., the boiling point of the solvent at 760 mm Hg, which for NMP is 396° F.), are handled as described directly above. When the evaporator 11 is maintained at atmospheric or greater pressure, an inert gas, e.g., nitrogen, is introduced through line 10 to maintain a controlled pressure as the volatile components are evaporated at a temperature below the normal boiling point of the polar organic solvent. The inert gas is ultimately removed with the other non-condensibles through line 27. The inert gas can be separated and recycled through line 10.

The use of the bag filter 12 is particularly appropriate when an inert gas is added to the evaporator 11. The bag filter 12 can be used with the vacuum process.

Solid effluent from evaporator 11 is a dry mixture which contains PPS, PPS oligomers, and NaCl is transferred through line 29 into reslurrying tank 31. Water, preferably, deionized water, is supplied through line 33 into the reslurrying tank 31 where with agitation supplied by agitator 35 a reslurried mixture which contains coarse particulate PPS, dispersed PPS oligomers, and an aqueous NaCl solution, is prepared.

Optionally, this reslurried mixture can be passed through line 37, valve 39 and line 41 to a decantation tank 43 in which coarse polymer is allowed to separate or settle in the liquid phase and at least a portion of the aqueous NaCl solution with dispersed PPS oligomers is decanted through line 45 for disposal or for further treatment. The coarse PPS particles are passed through line 47, valve 49 and line 51 to be screened.

If the decantation step is not used, coarse PPS particles from reslurry tank 31 are passed through line 37, valve 53 and line 51, to porous metal screen 55 where aqueous NaCl solution and PPS oligomers ("slime") along with wash water supplied through line 57 pass through the screen as filtrate while the coarse PPS polymer is collected on the screen and removed through line 59 as product. Optionally, the material in line 59 can be passed through multiple operations of reslurrying and screening before being passed to a product drying operation (not shown).

Filtrate from the screen 55 is passed through line 61 as, optionally, would be the decanted aqueous NaCl solution with dispersed "slime" from the decanting tank 43 into a vacuum drum filter 63 precoated with a suitable filter aid such as diatomaceous earth of cellulose fibers. Dispersed "slime" is retained on the filter coating, which is scraped off at certain time intervals and replaced by a fresh coating. Scraped-off filter aid/"slime" waste material is passed through line 67 to be discarded. While the "de-slimed" aqueous NaCl solution is passed through line 69 for disposal or further treatment.

The following are examples illustrating the process of the present invention. They are to be taken as illustrative and not exclusive.

EXAMPLE 1

In this example the preparation of poly(phenylene sulfide) (PPS) from an aqueous mixture of sodium sulfide, N-methyl-2-pyrrolidone (NMP) and p-dichlorobenzene (DCB), and the subsequent recovery of PPS by conventional solvent flashing is described. The PPS resin prepared by this method will be used as a control polymer for comparative screening tests.

An aqueous sodium sulfide solution was prepared by mixing 72.2 lb of a 50.35 weight percent NaOH solution with 87.3 lb of a solution containing 58.91 weight percent of sodium hydrogen sulfide (NaHS) and 0.62 weight percent of $Na_2S$. This sodium sulfide solution, 23.5 lb of sodium acetate, and 35.7 gallons of NMP were charged to an agitated pilot plant reactor, which was then purged with nitrogen. This mixture was first heated for about 10 minutes at a temperature of about 338°–340° F. and a pressure of 17 psig and then dehydrated by gradually raising the temperature to 454° F., at 17 psig, during a time interval of about 220 minutes.

Subsequently 132.1 lb of DCB were charged to the reactor, and the entire reactor mixture was heated for 2 hours at a temperature of about 454° F., while the pressure rose from 17 psig to 70 psig. The reactor temperature was then raised to 510° C., and the pressure increased to 145 psig during a period of 30 minutes. Continued heating of the reactor mixture was carried out at about 510° C. and 145–150 psig for about 1 hour.

About 55 psi of $CO_2$ was charged to the reactor, which was maintained at about 511° F./205 psig for 30 minutes.

The polymerization mixture was concentrated by partial solvent flashing at about 505° F. while the pressure was reduced from 205 psig to about 80 psig. Finally the partially desolventized slurry was heated to about 540° F., pressured to about 158 psig, and transferred to a blender, where essentially all liquids were evaporated at 530°–544° F. during a time interval of about 30 minutes.

The dry, salt-filled PPS was first washed with about 80 gallons of cold deionized water and then twice with about the same amount of hot deionized water at approximately 350° F./150 psig. After filtration, the PPS filter cake was dried at 200°–300° F. and atmospheric pressure conditions for about 3 hours. Dry PPS polymer obtained in 30 polymerization runs carried out at essentially the same conditions as described above were blended and used for various tests. The blend of this control polymer is labeled Run 1.

EXAMPLE II

In this example the preparation of poly(phenylene sulfide) (PPS) with sodium acetate as molecular weight modifier and the subsequent precipitation of coarse, granular PPS in the presence of water is described.

An aqueous sodium sulfide solution was prepared by mixing 72.0 lb of a 50.75 weight percent NaOH solution with 87.8 lb of a solution containing 58.75 weight percent of NaHS and 0.36 weight percent of $Na_2S$. This solution was charged to a stirred pilot plant reactor containing 23.5 lb of sodium acetate and 27.7 gallons of N-methyl-2-pyrrolidone (NMP) under a nitrogen atmosphere, followed by flushing with 8.0 gallons of NMP. The entire mixture was first heated without evaporation for 17 minutes at a temperature of about 334°–338° F. and a pressure of about 17 psig and was then dehydrated by gradually raising the temperature to a final temperature of about 458° F., during a time period of about 100 minutes, at an essentially constant pressure of 17 psig.

Subsequently 133.4 lb of p-dichlorobenzene (DCB) were charged to the reactor, and the entire mixture was heated for 2 hours at a temperature ranging from 443° F. (initial) to 450° F., at a pressure ranging from 30 psig (initial) to 68 psig. The reactor temperature was then raised to about 508°–510° F., and the pressure was increased to about 135–146 psig during a period of 30 minutes. Heating at these conditions was carried out for 3 hours to complete the polymerization reaction.

Thereafter the reactor temperature was lowered to about 250° F. and the pressure was reduced to 12 psig during a 2 hour time interval. This operation, which was carried out under stirring at a rotor speed of about 350–400 r.p.m., resulted in a separation of the reaction mixture into two phases: a PPS phase and an NMP phase containing essentially all impurities. Finally 10 gallons of NMP were added, and the temperature was allowed to further drop to about 160° F. with essentially no further change in pressure.

EXAMPLE III

This example describes the evaporation of volatiles from a nitrogen-purged reactor slurry at Example II under vacuum conditions. About 4.1–4.8 Kg of said reactor slurry containing granular PPS, poly(phenylene sulfide) oligomer ("slime"), NMP, water, unreacted reactants and sodium chloride by-product were placed in a nitrogen-purged 2-gallon stainless steel reactor. The slurry was heated while being stirred at a speed of about 250 r.p.m. Some water started evaporating at about 243° F. (117° C.) under atmospheric pressure conditions. The bulk of the liquid was evaporated after the pressure was reduced from about 760 torr to about 5 torr, within about 3 hours, at about 350° F. (177° C.) while a nitrogen stream was passed through the slurry. About 3.3–3.5 liters of liquids (mainly NMP and water) were collected in a cooled overhead accumulator.

After allowing the reactor content to cool overnight under a nitrogen atmosphere, about 1 gallon of deionized water was added to the dry polymer/salt mixture. The reactor content was stirred for about 30 minutes without heating. The slurry was filtered, and the polymer filter cake plus 1 gallon of deionized water were added back to the reactor. The resulting slurry was stirred, heated to about 350° F. within approximately 45–60 minutes, and filtered after cooling. The above-described washing step with hot deionized water was repeated once. The washed PPS was dried in a forced-air oven at 250° F.

Five PPS samples treated as described above were blended and used for screening and spinning tests. The PPS blend is labeled Run 2.

EXAMPLE IV

In this example the particle size distribution of PPS resin recovered by conventional solvent flashing (Run 1, Example I) and by precipitation in the presence of water and sodium acetate and subsequent vacuum evaporation (Run 2, Example III) are compared.

Screening analyses were carried out as follows:

PPS resin was washed with water and acetone and dried in an oven at 250° F. Dried PPS resin was first blended in a 5-gallon drum tumbler for 30 minutes. A sample of about 200 grams was placed in a drying oven at 200° F. and dried for about 30 minutes until no more moisture loss occurred. A small amount of carbon black (100–200 mg) was added as an antistatic agent to the PPS sample, which was then shaken manually in a jar.

The dried PPS sample was poured onto the top screen of an electric Cenco-Meinzer sieve shaker (catalog number 18480) and shaken at speed setting "5" (650 cycles per minute) for 30 minutes. After weighing the amount on each screen, the shaking operation was repeated for 10–15 minutes until no more weight change occurred. The sieve battery was tapped with a wooden object before each weighing to loosen particles that clung to the screens. Screening data are listed in Table 1.

TABLE 1

|  | Run 1 (Control) | Run 2[a] (Invention) |
| --- | --- | --- |
| % greater than 1.20 mm | 5.3 | 12.6 |
| % greater than 0.85 mm | 19.4 | 39.4 |
| % greater than 0.60 mm | 32.1 | 66.0 |
| % greater than 0.30 mm | 66.7 | 91.0 |
| % greater than 0.15 mm | 78.3 | 96.7 |

[a]average of 12 screening analyses.

Data in Table I clearly show that the PPS resin of Run 2 recovered by the vacuum evaporation process of this invention is considerably coarser, and thus more easily filterable and less dusty, than the PPS resin of Run 1 recovered by conventional solvent flashing.

EXAMPLE V

In this example the PPS was recovered by vacuum evaporation from the slurry of Example II with a nitrogen purge as described in Example III, except that prior to the filtration of the slurry of dried PPS polymer and cold water the aqueous solution was decanted to remove a major portion of "slime" (PPS oligomer). Samples obtained from five evaporation runs according to the above-described procedure were blended. This blend is labeled Run 3.

EXAMPLE VI

In this example the evaporation of volatiles from the reactor slurry of Example II was carried out under vacuum conditions in accordance with the procedure of Example III, except that the slurry was purged with air instead of nitrogen. Dried PPS samples of four vacuum evaporation runs with air purge were blended. This blend is labeled Run 4.

EXAMPLE VII

In this example the evaporation of volatiles from the reactor slurry of Example II was carried out under vacuum conditions with air purge as described in Example VI, except that the final temperature during the vacuum evaporation was 280° F. (138° C.) and that prior to the filtration of the slurry of dried PPS and cold water the aqueous phase was decanted to remove a major portion of "slime" (see Example V). Samples from two evaporation runs at 280° F. with air purge were blended. This blend is labeled Run 5.

EXAMPLE VIII

In this example the extrusion of fibers from PPS resin recovered by precipitation in the presence of water and subsequent vacuum drying is described. The grannular PPS resin was dried under vacuum conditions of about 110° C. for about 15 hours and then spun into fibers without prior pelletizing. The water-cooled polymer feed was extruded in a 1" Wayne Machine and Die Co. extruder through 60/100/200/Dynalloy XIIL/60 mesh pack screens and a spinneret having 34 holes of 0.048" length and 0.012" diameter, at a rate of about 4.4 g/cm$^2$/minute. A 15 weight % solution of Nopcostat 2152-P, marketed by the Process Chemicals Division of Diamond Shamrock Corporation, Morristown, N.J., was used as the finish on the spun PPS yarn. The extruded strand of 34 yellow PPS filaments was drawn over a hot plate of 100° C. to a final draw ratio of 4.0–4.2.

EXAMPLE IX

Properties of washed granular PPS resin recovered by vacuum evaporation and fiber strands produced therefrom in accordance with the procedure described in Example VIII are summarized in Table II.

TABLE II

|  | Run 2 (Example III) | Run 3 (Example V) | Run 4 (Example VI) | Run 5 (Example VII) |
|---|---|---|---|---|
| Flow Rate$^a$, g/10 min | 523 | 322 | 351 | 323 |
| Ash, weight % | 0.54 | 0.39 | 0.38 | 0.42 |
| Insolubles$^b$, ppm | 370 | 72 | — | 43 |
| Tmc$^c$, °C. | 191 | 193 | 212 | 184 |
| Denier$^d$ | 216 | 223 | 228 | 228 |
| Tenacity$^e$, gpd | 2.7 | 3.7 | 3.2 | 3.9 |
| Elongation$^e$, % | 20 | 20 | 22 | 18 |
| Initial Modulus, gpd | 41 | 42 | 42 | 49 |
| Spinnability, minutes to break | 30 | >60 | 2 | >60 |

$^a$determined at 316° C. according to a modified ASTM D1238 method employing an orifice of 0.0825" diameter and 0.315" length and an effective weight of 5.0 Kg (including the weight of the piston)
$^b$not soluble in a α-chloronaphthalene; 40 grams of PPS were heated with about 1000 cc of α-chloronaphthalene at about 240° C. for approximately 2 hours;
$^c$determined with a Perkin Elmer DSC-2C differential scanning calorimeter; cooling of the polymer melt started at 360° C.; rate of cooling was 20° C./minute;
$^d$weight in grams of 9000 meters of the yarn;
$^e$determined with an Instron 1122 tensile tester; the yarn was stretched at a rate of about 200 mm/min.

Data in Table II show:
(1) removal of "slime" prior to filtration of the slurry of PPS and cold water (Run 3 vs. Run 2) resulted in lower ash content, lower insolubles content, higher yarn tenacity and better spinnability (fewer breaks);
(2) vacuum evaporation in the presence of nitrogen in lieu of air (Run 2 vs. Run 4) resulted in considerably better spinnability (fewer breaks);
(3) lowering the temperature during evaporation and "slime" removal prior to the cold water/PPS slurry filtration (Run 5 vs. Run 4) resulted in higher yarn tenacity and considerably better spinnability (fewer breaks). Run 5 is presently considered the preferred mode of operation.

EXAMPLE X

In this example the extrusion of a film from granlar PPS resin recovered by the vacuum evaporation process of this invention is described. About 6 lb of granular resin were dried in a Blue-M oven at 350° F. for about 5 hours and extruded in a 1½" Davis-Standard extruder at a die temperature of about 599° F. into strands, which were then cut into pellets.

These pellets were vacuum-dried at about 230° F. overnight and were then extruded in a Kenney Sheet Line extruder at a melt temperature of about 640° F. through a 6" wide die having a 0.025" die gap. The extruded film was passed over rolls having a temperature of about 116° F. and was stretched to a thickness of about 0.015" by a takeup roll at a speed of about 100 rpm. The produced film had good appearance and contained very few bubbles.

EXAMPLE XI

This calculated example illustrates the operation of removing volatiles from a commercial PPS reactor slurry at non-vacuum conditions. A plant-size batch comprising about 6700 pounds of PPS (including 5–8 weight percent "slime"), about 7200 pounds of NaCl, about 14,000 pounds of NMP plus about 3500 pounds of $H_2O$, and having a temperature of about 250° F. (121° C.) is evaporated to dryness in an agitated dryer at a temperature of about 248° F. (120° C.) and a total pressure of about 800 mm Hg. A heat input of about $5.4 \times 10^6$ BTU/hour is required to accomplish the evaporation process in about 3–5 hours.

At the beginning of the evaporation process, the sum of the vapor pressures of NMP and $H_2O$ is sufficient to provide a total operating pressure of 800 mm Hg, at an essentially constant temperature of about 248° F. As the evaporation progresses and the amount of the more volatile component (H₂O) in the liquid phase decreases, the total vapor pressure drops, and increasing amounts of an inert gas, preferably nitrogen, have to be introduced into the dryer to provide a controlled total pressure of about 800 mm Hg (15.5 psi). The progressive changes in the composition of the liquid and vapor phases are demonstrated by calculated data summarized in TABLE III.

TABLE III

| Mole Fractions | | | | |
|---|---|---|---|---|
| In Liquid Phase | | In Vapor Phase | | |
| NMP | H₂O | NMP | H₂O | N₂ |
| 0.50 | 0.50 | 0.0375 | 0.9625 | 0.0 |
| 0.55 | 0.45 | 0.041 | 0.866 | 0.093 |
| 0.61 | 0.39 | 0.046 | 0.750 | 0.204 |
| 0.67 | 0.33 | 0.050 | 0.640 | 0.310 |
| 0.735 | 0.265 | 0.055 | 0.510 | 0.435 |
| 0.85 | 0.15 | 0.064 | 0.290 | 0.646 |
| 0.965 | 0.035 | 0.072 | 0.067 | 0.861 |

In order to accelerate the removal of NMP after essentially all water and about 92 percent of NMP have been evaporated, the temperature can be raised to a maximum of about 400° F.

Exiting nitrogen gas passes through a bag filter for retention of solid fines and is cooled to about 100°-110° F. for condensation of NMP and H₂O in a vapor-liquid separator. The solvent-free recycle nitrogen and an appropriate amount of nitrogen feed gas are pumped with a 550 HP blower through a heat exchanger of about 2.5 × 10⁶ BTU/hour capacity to heat the gases to about 250° F. before they are introduced into the dryer. Following completion of drying, the salt-filled PPS polymer is cooled and washed in accordance with the procedure illustrated in FIG. 1.

We claim:

1. A method for recovery of granular poly(arylene sulfide) from a slurry comprising granular poly(arylene sulfide), polar organic solvent, alkali metal halide, poly(arylene sulfide) oligomers, and unreacted reactants, said method comprising:
    (a) treating a polymeric reaction mixture comprising polar organic solvent and molten poly(arylene sulfide) in the presence of an amount of a liquid soluble in the polar organic solvent but said liquid not itself a solvent for poly(arylene sulfide) said amount sufficient to cause a phase separation of molten poly(arylene sulfide) from polar organic solvent upon reducing the temperature of said reaction mixture sufficiently to produce a slurry of granular poly(arylene sulfide) in polar organic solvent;
    (b) reducing the temperature of said reaction mixture sufficiently to produce a slurry of granular poly(arylene sulfide) in polar organic solvent said slurry also containing alkali metal halide, poly(arylene sulfide) oligomers, unreacted reactants and liquid soluble in the polar organic solvent;
    (c) heating said slurry of (b) under pressure conditions sufficient to evaporate polar organic solvent, liquid soluble in the polar organic solvent and volatile impurities at a temperature below the normal boiling point of said polar organic solvent, thereby producing a dried mixture comprising poly(arylene sulfide), poly(arylene sulfide) oligomers, and alkali metal halide,
    (d) reslurrying said dried mixture with water to extract alkali metal halide and disperse poly(arylene sulfide) oligomers in a reslurried mixture, and
    (e) classifying reslurried mixture through a classifying means thereby recovering granular poly(arylene sulfide) on said classifying means and passing a first filtrate comprising poly(arylene sulfide) oligomers and aqueous alkali metal halide solution through said classifying means.

2. A method of claim 1 wherein said pressure conditions of (c) comprise vacuum.

3. A method of claim 1 wherein said pressure conditions comprise at least atmospheric pressure and said pressure is controlled at a near constant level by addition of an inert gas so that said polar organic solvent, water and volatile impurities are evaporated.

4. A method of claim 2 further comprising:
    (f) filtering first filtrate through a filter aid coated filter thereby recovering poly(arylene sulfide) oligomers thereon and passing a second filtrate comprising aqueous alkali metal therethrough.

5. A method of claim 1 wherein poly(arylene sulfide) is poly(phenylene sulfide), polar organic solvent is N-methyl-2-pyrrolidone (NMP), and alkali metal halide is NaCl and said liquid soluble in polar organic solvent is water.

6. A method of claim 4 wherein poly(arylene sulfide) is poly(phenylene sulfide), polar organic solvent is N-methyl-2-pyrrolidone, alkali metal halide is NaCl, and said liquid soluble in polar organic solvent is water.

7. A method of claim 1 wherein the reslurried mixture of (d) is treated by (1) allowing said granular poly(arylene sulfide) to settle, and (2) removing at least a portion of water containing extracted alkali metal halide and dispersed poly(arylene sulfide) oligomers before filtering.

8. A method of claim 1 wherein during the evaporation step (c) a stream of gas is passed through said slurry.

9. A method of claim 8 wherein the gas is chosen from among air and nitrogen.

10. A method of claim 1 wherein said recovered granular poly(arylene sulfide) is dried and subjected to further treatment suitable to prepare manufactured articles.

11. A method of claim 10 wherein said articles are chosen from the group consisting of films, sheets, fibers, molded objects, and extruded articles.

12. A method of claim 3 further comprising: (f) filtering first filtrate through a filter aid coated filter thereby recovering poly(arylene sulfide) oligomers thereon and passing a second filtrate comprising aqueous alkali metal therethrough.

13. A method of claim 3 wherein the reslurried mixture of (d) is treated by (1) allowing said granular poly(arylene sulfide) to settle, and (2) removing at least a portion of water containing extracted alkali metal halide and dispersed poly(arylene sulfide) oligomers before filtering.

14. A method of claim 4 wherein during the evaporation step (c) a stream of gas is passed through said slurry.

15. A method of claim 12 wherein during the evaporation step (c) a stream of gas is passed through said slurry.

16. A method of claim 2 wherein said recovered granular poly(arylene sulfide) is dried and subjected to further treatment suitable to prepare manufactured articles.

17. A method of claim 3 wherein said recovered granular poly(arylene sulfide) is dried and subjected to further treatment suitable to prepare manufactured articles.

18. A method of claim 4 wherein said recovered granular poly(arylene sulfide) is dried and subjected to further treatment suitable to prepare manufactured articles.

19. A method of claim 12 wherein said recovered granular poly(arylene sulfide) is dried and subjected to further treatment suitable to prepare manufactured articles.

20. A method of claim 16 wherein said articles are chosen from the group consisting of films, sheets, fibers, molded objects, and extruded articles.

21. A method of claim 17 wherein said articles are chosen from the group consisting of films, sheets, fibers, molded objects, and extruded articles.

22. A method of claim 18 wherein said articles are chosen from the group consisting of films, sheets, fibers, molded objects, and extruded articles.

23. A method of claim 19 wherein said articles are chosen from the group consisting of films, sheets, fibers, molded objects, and extruded articles.

* * * * *